United States Patent [19]

Dudar et al.

[11] 4,210,676
[45] Jul. 1, 1980

[54] PROCESS AND APPARATUS FOR THE ACCELERATION OF THE RIPENING OF SPIRITS

[75] Inventors: Klaus Dudar; Ewald Seliger; Gertraude Hübner; Wilhelm Banse, all of Halle, German Democratic Rep.

[73] Assignee: VEB Rationalisierung Halle, Halle, German Democratic Rep.

[21] Appl. No.: 8,501

[22] Filed: Feb. 1, 1979

[30] Foreign Application Priority Data

Feb. 1, 1978 [DD] German Democratic Rep. ... 203503

[51] Int. Cl.² ............................................. C12H 1/22
[52] U.S. Cl. ..................................... 426/238; 99/451; 99/277.2
[58] Field of Search ................ 426/238; 99/451, 277.2

[56] References Cited

U.S. PATENT DOCUMENTS

| 2,163,650 | 6/1939 | Weaver | 426/238 X |
| 2,742,367 | 4/1956 | Bachert | 426/238 X |
| 2,775,434 | 12/1956 | Probst | 426/238 X |
| 2,807,547 | 9/1957 | Nickol | 99/277.2 |

FOREIGN PATENT DOCUMENTS 545386 3/1956 Belgium ................................. 426/238

Primary Examiner—Arthur D. Kellogg
Attorney, Agent, or Firm—Michael J. Striker

[57] ABSTRACT

A process for acceleration of the ripening of spirits is described, wherein the spirits are irradiated with ultrasonic radiation in the presence of wood staves which serve as a source of bouquet-improving additives. Through control of the irradiation parameters, reproducible results may be achieved on the industrial level. Circulation of the spirits within the irradiation chamber increases the uniformity of the irradiation. An apparatus is described for a continuous performance of the process on an industrial level.

10 Claims, 4 Drawing Figures

PROCESS AND APPARATUS FOR THE ACCELERATION OF THE RIPENING OF SPIRITS

BACKGROUND OF THE INVENTION

This invention is in the field of the manufacture of alcoholic spirits. It is directed towards a process for the acceleration of the ripening or aging process through the use of ultrasonic treatments.

The conventional procedure for ripening (aging) of spirits derived from grapes or grain has been storage over extended periods, in oak casks or metal tanks with oak inserts, of the distillates. This natural aging process is associated with substantial space requirements, and requires from many months to years to come to fruition.

There are known methods for the acceleration of this natural aging process. One type of procedure involves treatment of the distillates with gases such as ozone, oxygen, nitrogen and mixtures thereof, often with simultaneous UV-treatments. Short periods of treatment in ball mills and heat treatments with electrical current have also been employed to accelerate the aging process.

Ultrasonic treatment of the distillates in the presence of taste-improving additives is also a known procedure. Two patents describe this type of process, namely DD-PS No. 119,614 "Process for Quick-ripening of Spirits" and CH-PS "Ultrasonic Treatments in Casks". In both of these patents, ultrasonic treatment is used to accelerate both the chemical reaction involved with aging process and the extraction of bouquet-improving components from additives (e.g. wood). The disadvantage of the known processes lies in their lack of reproducible quality parameters, as the important technical aspects have not been isolated and controlled.

SUMMARY OF THE INVENTION

It is an object of the present invention to provide an industrial process for the ripening (aging) of spirits which insures accelerated aging with reproducible quality parameters.

This is achieved through the treatment of the spirits in the presence of bouquet-improving additives, preferably wood, with an ultrasonic field of optimal operational frequency and with the greatest possible uniformity of intensity distribution over the total volume.

To maximize the uniformity of the effect of the ultrasonic treatment over the entire volume of the spirits, the liquid is circulated by a pump through the irradiation chamber during the ultrasonic irradiation. The use of flow distributors, resonator chambers and special arrangements for wood staves used as bouquet-improving components aids in the achievement of this purpose.

The process is effected in a closed system insulated from heat exchange. The process thus approaches an adiabatic one.

As the amount of absorbed ultrasonic energy, and the corresponding rise in temperature, is dependent upon the degree of ripeness of the spirits, a direct temperature control is made possible through the use of an adiabatic process. The amount of energy absorbed is also dependent upon the particular spirit being treated. The accuracy of temperature selection should approximately reach $\leq \pm 1/10°$ C.

By acting upon the medium with an increased static pressure, through the use of compressed gas, the degree of efficacy of the ultrasonic treatment is improved. This pressure is also dependent upon the particular choice of medium. By regulating the pressure in relation on the ultrasonic intensity, the cavitation effect in the medium may be increased by a few orders of magnitude.

It has been found that the inventive process results in considerable savings in time and yields products of very good quality within the following parameters:

Ultrasonic frequency: 20–50 kHz, preferably 35 kHz
Specific ultrasonic output: ca. 1.7 W/l
Average ultrasonic intensity: ca. 0.5 W/cm$^2$
Wood surface area (dependent upon the particular spirit): 20–40 cm$^2$/l
Circulation cycles: 3/hr.

The given ultrasonic parameters have been optimalized and guarantee, in conjunction with the determination of the length of irradiation and amount of wood surface area required for any particular spirit, a controlled industrial process for the enderated ripening of spirits in conjunction with the extraction of bouquet-improving additives.

The novel features which are considered as characteristic for the invention are set forth in particular in the appended claims. The invention itself, however, both as to its construction and its method of operation, together with additional objects and advantages thereof, will be best understood from the following description of a specific embodiment of the apparatus when read in conjunction with the accompanying drawings.

DESCRIPTION OF A PREFERRED EMBODIMENT

Figure 1:
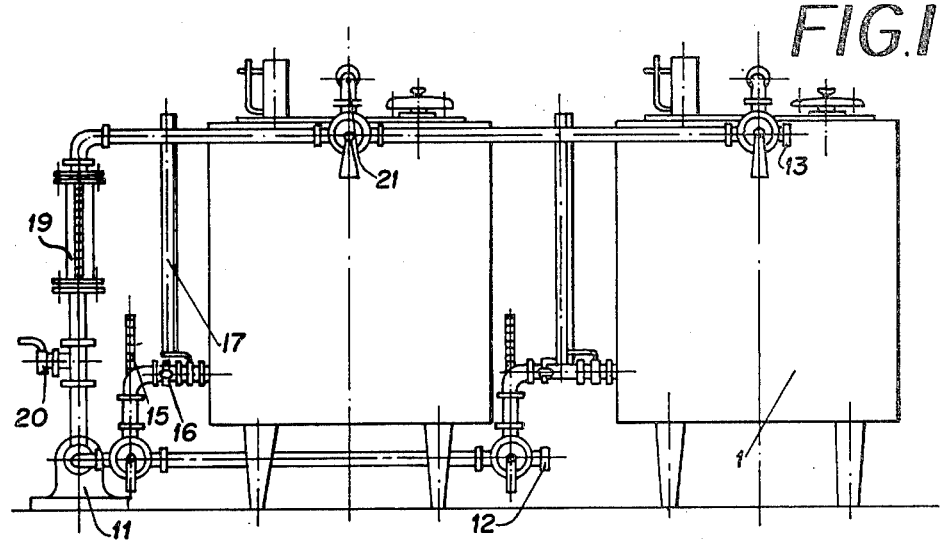
FIG. 1 is a schematic side view of an apparatus for performing the inventive process.
Figure 2:
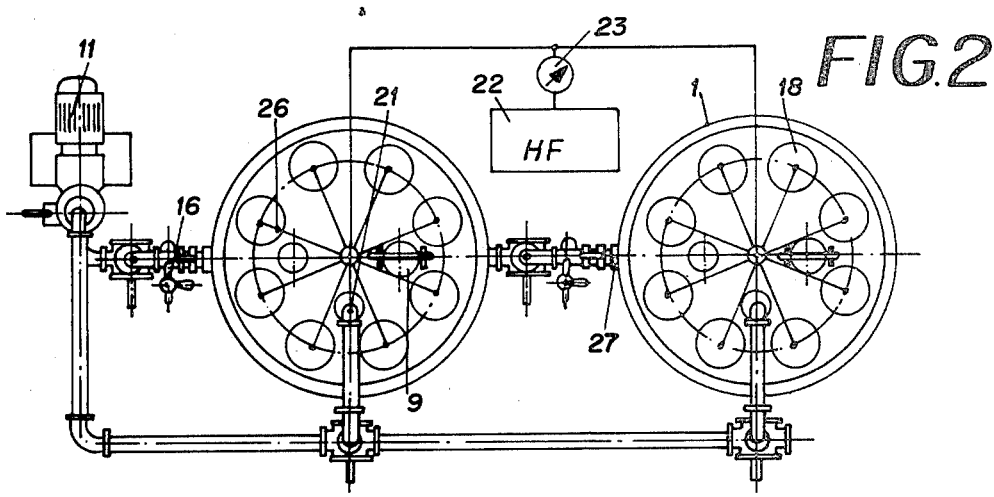
FIG. 2 is a view of the apparatus from above in FIG. 1.
Figure 3:
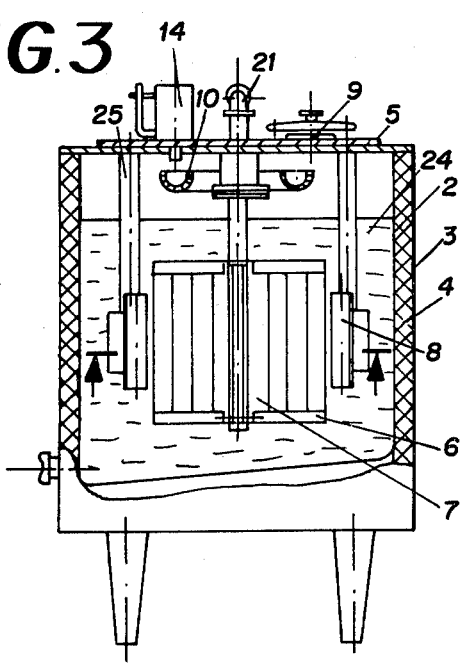
FIG. 3 is a vertical section through the ultrasonic irradiation chamber of the apparatus.
Figure 4:
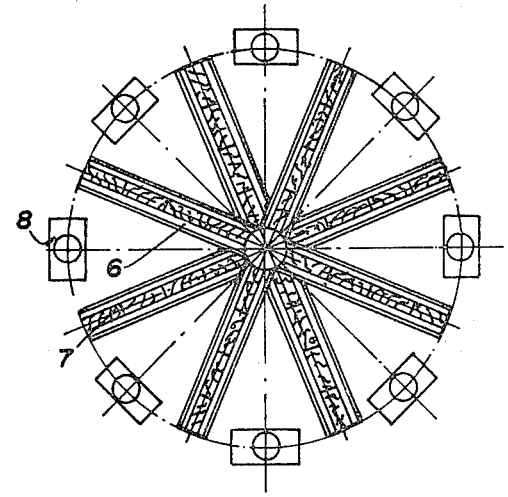
FIG. 4 is a cross-section through the irradiation chamber, showing the arrangement of the wood staves and capsule resonators.

The apparatus for carrying out the inventive process, according to a preferred embodiment, consists of two irradiation chambers 1 which are provided with capsule resonators 8. In order to avoid the periods of disuse which are technologically mandated by the irradiation process, the irradiation chambers are adapted so as to be alternately irradiated, as well as alternately filled and emptied.

As may be seen from the drawing, the two irradiation chambers comprise part of an irradiation installation which may be extended by connection of additional chambers to the free connections 12 and 13.

The irradiation energy is provided by an ultrasonic generator 22. The efficient function of the generator 22 is monitored by a measurement device 23 installed between the generator and the immersion resonators 8. As noted above, the narrow tolerance range of ultrasonic intensity required in order to maintain the quality parameters according to the inventive process is of great importance. The preferred embodiment is therefore additionally provided with a specially designed probe (not shown) for measurement of the irradiation intensity within the irradiation chamber. This may be advantageously introduced into the system through the hatch 9. This probe may be connected to the irradiation measurement device 23 for periodic read-out of the measured values.

In order to insure adiabatic operating parameters, irradiation chambers 1 of the preferred embodiment are provided with a double casing. Insulating material 4 (e.g. a foam plastic) is provided for the space between the inner casing 2 and the outer casing 3.

The irradiation chambers 1 are provided with covers which hermetically seal the system. The covers 5 are provided with holders 6 for the wood staves 7 and the capsule resonators 8. These holders are designed to so orient the resonators 8 as to provide the greatest homogeneity of the irradiation field in the reaction medium 24, and to allow for irradiation of the wood staves 7 from all sides without interference. The resonators 8 are attached to conduits 25 provided with detachable hatch covers 18, allowing for the operation and control of each resonator independently of the others. Through the conduits 25 are introduced high-frequency cables 26 which are connected to the resonators 8.

Through the use of a pump 11, filling and emptying of the irradiation chamber via the inlet 21 and outlet 27 may be effected, as well as the circulation of the medium 24 during the irradiation process. In the conduit between the pump 11 and the inlet 21 flow rate measurement device 19 is installed. The irradiation chamber 1 is provided with a baffle or deflector 10 to insure a uniform distribution of the medium 24 after its introduction through inlet 21.

To control the pressure within the chamber 1, the cover 5 is provided with a pressure regulator 14. The taking of samples make be effected through stopcock 16. Recovery of the finished product may be effected through outlet 20.

It will be understood that each of the elements described above, or two or more together, may also find a useful application in other types of a process and apparatus for the acceleration of the ripening of spirits differing from the types described above.

While the invention has been illustrated and described as embodied in a process and apparatus for the acceleration of the ripening of spirits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims.

1. A process for acceleration of the ripening process of spirits through ultrasonic irradiation of the spirits in the presence of bouquet-improving additives, preferably wood, in which the spirit serves as the transmission medium for the ultrasonic waves, wherein the spirit liquid is circulated within a closed system and treated throughout its entire volume with an ultrasonic frequency of between 20–50 kHz and a specific ultrasonic output of about 1.7 W/l, an average ultrasonic intensity of about 0.5 W/cm$^2$, the liquid being in contact with a wood surface area which is dependent upon the spirit being treated and ranges between 20–40 cm$^2$/l, and the treatment being effected within a time period of between about 30–60 minutes while the liquid is circulated at a circulation rate of 3–4 cycles per hour.

2. A process as defined in claim 1, wherein the ultrasonic frequency is 35 kHz.

3. A process as defined in claim 1, wherein the spirit is subjected to a constant pressure of maximally 6 kp/cm$^2$ through the action of compressed gas in a fixed relation to the irradiation intensity, thereby increasing degree of efficacy of the irradiation through an increase in cavitation effects.

4. An apparatus for acceleration of ripening of spirits through ultrasonic irradiation, comprising means forming at least one irradiation chamber provided with an inlet and an outlet for the spirits; resonators for introducing ultrasonic radiation into the spirits in said chamber; covers for hermetically sealing said irradiation chamber; holders attached to said covers for orienting said resonators so as to insure uniformity of irradiation and also holding wood staves serving as bouquet-improving additive; and a pump for circulating said spirits within said irradiation chamber.

5. An apparatus as defined in claim 4, further comprising a baffle for improving the circulation of said spirits.

6. An apparatus as defined in claim 4, wherein said irradiation chamber further comprises an inner and outer casing, and insulation material between said inner and outer casings.

7. An apparatus as defined in claim 4, further comprising a flow rate measurement device between said pump and said inlet.

8. An apparatus as defined in claim 4, further comprising means for measuring the fullness of the irradiation chamber.

9. An apparatus as defined in claim 4, wherein said resonators are supplied with ultrasonic energy by high-frequency cables from an ultrasonic generator.

10. An apparatus as defined in claim 4, further comprising means for measuring the output of said ultrasonic generator.

* * * * *